United States Patent
Kobayashi

(10) Patent No.: US 7,212,626 B1
(45) Date of Patent: May 1, 2007

(54) INFORMATION TERMINAL CAPABLE OF ORIGINATING A CALL, METHOD OF ORIGINATING A CALL AND RECORDING MEDIUM WHICH STORES THE PROGRAM FOR ORIGINATING A CALL

(75) Inventor: Yoshikazu Kobayashi, Tokyo (JP)

(73) Assignee: Nec Infrontia Corporation, Kawasaki (JP)

( * ) Notice: Subject to any disclaimer, the term of this patent is extended or adjusted under 35 U.S.C. 154(b) by 0 days.

(21) Appl. No.: 09/238,502

(22) Filed: Jan. 27, 1999

(30) Foreign Application Priority Data

Jan. 28, 1998 (JP) .................................. 10-015705

(51) Int. Cl.
*H04M 1/26* (2006.01)
(52) U.S. Cl. .................................. 379/354; 379/355.01
(58) Field of Classification Search ................ 379/354, 379/142.1, 127.06, 349, 110.01, 142.01; 370/352, 356; 455/412, 415
See application file for complete search history.

(56) References Cited

U.S. PATENT DOCUMENTS

| | | | |
|---|---|---|---|
| 5,588,049 A * | 12/1996 | Detering et al. | 379/142.04 |
| 5,754,636 A * | 5/1998 | Bayless et al. | 379/142.1 |
| 5,966,652 A * | 10/1999 | Coad et al. | 455/412.1 |
| 6,240,168 B1 * | 5/2001 | Stanford et al. | 379/110.01 |
| 6,337,858 B1 * | 1/2002 | Petty et al. | 370/356 |
| 6,339,592 B2 * | 1/2002 | Fugino et al. | 370/352 |

FOREIGN PATENT DOCUMENTS

| | | |
|---|---|---|
| GB | 2 306 871 A | 5/1997 |
| JP | 62-164350 | 7/1987 |
| JP | 02-101852 | 4/1990 |
| JP | H3-46855 | 2/1991 |
| JP | H6-77995 | 3/1994 |
| JP | H8-125724 | 5/1996 |
| JP | H8-139624 | 5/1996 |
| JP | 09-55815 | 2/1997 |

OTHER PUBLICATIONS

8 Screenshots taken from the PrimaSoft Dialer, Copyright 1995, 96 by PrimaSoft PC, Inc. (binary available at ftp://ftp.simtel.net/pub/simtelnet/win3/telecomm/16pspd14.zip).*

(Continued)

*Primary Examiner*—Sinh Tran
*Assistant Examiner*—Walter F Briney, III
(74) *Attorney, Agent, or Firm*—Sughrue Mion, PLLC

(57) ABSTRACT

An information terminal according to the present invention is provided where a telephone number is directly extracted from a window displayed, and call dialing is performed based upon the extracted telephone number. In the information terminal, a control OS execution circuit 7 extracts character information 111 including a numeral from a window such as a word processor window displayed the display 6 while a word processor OS is functioning, by designating its contained region with the display inversion, or with a frame enclosing the region. It then extracts no more than a numeral from the character information, and displays it in a telephone call dialing window (a first window), with the help of the telephone OS execution circuit 8. It then call-dials, based upon the displayed numeral, to a telephone line L.

24 Claims, 10 Drawing Sheets

OTHER PUBLICATIONS

8 Screenshots taken from the PrimaSoft Contact Book, Copyright 1994, 97 by PrimaSoft PC, Inc. (binary available at http://wcarchive.cdrom.com/pub/simtelnet/win3/pim/am_cb44.zip).*

Extended ETSI Hayes AT command parameters [online], not dated [retreived on May 1, 2006]. Retrieved from http://www.cellular.co.za/hayesat.htm. pp. 1-3.*

1 Screenshot taken from the PrimaSoft Dialer, Copyright 1995, 96 by PrimaSoft PC, Inc. [screenshot generated May 9, 2006]. Binary retrieved from ftp://ftp.simtel.net/pub/simtelnet/win3/telecomm/16pspd14.zip. Figure 9.*

* cited by examiner

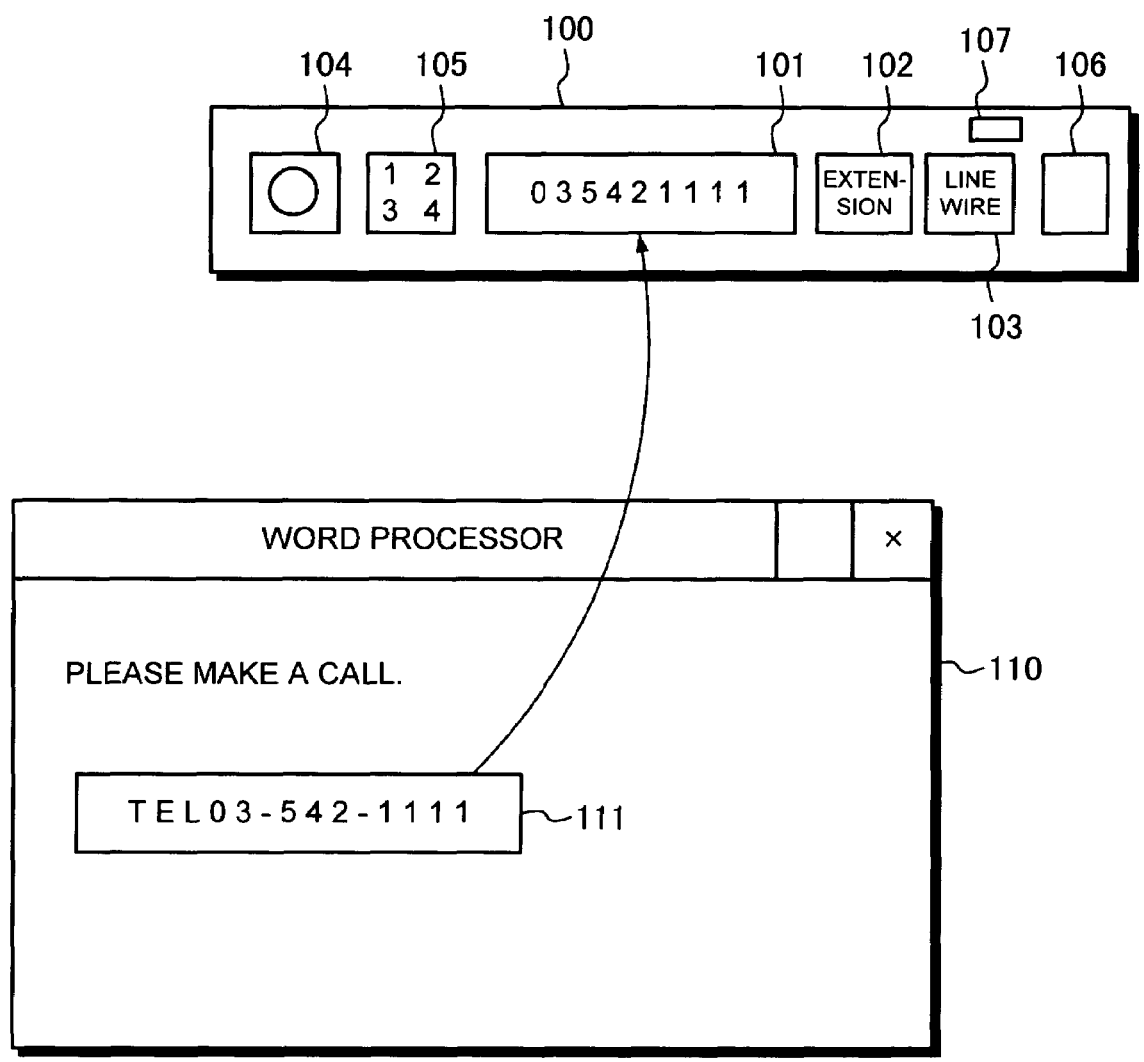
F I G . 7

INFORMATION TERMINAL CAPABLE OF ORIGINATING A CALL, METHOD OF ORIGINATING A CALL AND RECORDING MEDIUM WHICH STORES THE PROGRAM FOR ORIGINATING A CALL

BACKGROUND OF THE INVENTION

1. Field of the Invention

The present invention relates to an information terminal capable of originating a call to a telephone line. It specifically relates to an information terminal with an operating system (hereafter, referred to as "OS") for displaying a window, a method of originating a telephone call utilized in the information terminal, and a recording medium which stores programs for originating telephone calls.

2. Description of the Related Art

The conventional OSs exist which display data resulting from the execution of several programs, for example, "Windows 95" made by Microsoft Corporation.

The information terminal in which the OS is installed, has either a telephone line interface for permitting telephone communication through a telephone line or a modem which is connected to the telephone line, so that the telephone communication can be made with the assistance of the OS which can display windows on a monitor. According to the OS, it is possible to display a telephone panel window or telephone key window for inputting a telephone number by clicking with a pointing device connected to the information terminal. The telephone panel window displays a ten-key numeric pad or shortened dialing buttons in the telephone window. When one of either the ten-key numeric pad or shortened dialing buttons is designated by clicking with the pointing device, then a call-dialing to the telephone line is practiced.

However, since telephone calls are practiced only through the telephone panel window. If a user wants to dial a telephone number which is displayed in a work window of a word processing program, the user needs to have the telephone window displayed in the monitor, and then user must enter an identical telephone number to that displayed in the work window, by operating the ten-key numeric keys displayed in the telephone panel window. Therefore, its manipulation is a troublesome task for the user.

SUMMARY OF THE INVENTION

Accordingly, the objective of the present invention is to provide a telephone call dialing method and an information terminal which selects a telephone number directly from character information displayed on a window, and originates a call to the telephone number selected.

Another objective of the present invention is to provide a recording medium that stores a telephone call dialing program used to select a telephone number directly from character information displayed on a window, and dial a call to the telephone number selected.

According to an aspect of the present invention, a telephone call dialing method for use in an information terminal with an operating system (OS) which can display a plurality of windows, is provided by the steps of: selecting a string of character information in a window displayed by the selecting a string of character information in a window displayed by the operating system, and storing the selected string of character information; extracting a telephone number from the stored string of character information; and call dialing based upon the extracted telephone number, to a line.

According to another aspect of the present invention, a telephone call dialing method for use in an information terminal with an operating system (OS) which can display a plurality of windows, is provided by the steps of: displaying a first window for a call dialing operation; selecting a string of character information in a second window displayed by the operating system, and storing the selected string of character information; extracting a telephone number from the stored piece of character information; displaying the extracted telephone number in the first window; and call dialing based upon the extracted telephone number, to a line. The call dialing is designated by the first window. The first window can be a tool bar.

According to still another aspect of the present invention, an information terminal with an operating system (OS) which can display a plurality of windows, is provided by: storage medium for storing a piece of character information selected from a window displayed by the operating system; extracting circuit for extracting a telephone number from the piece of character information stored in the storage means; and output circuit for outputting the extracted telephone number in order to call-dial to a line. The output circuit can be connected to a call dialing control circuit which controls a call dialing operation.

According to still another aspect of the present invention, an information terminal with an operating system (OS) which can display a plurality of windows, is provided by: display application circuit for executing an application used to display a first window for designating a call dialing operation; selection circuit for selecting a string of character information in a second window displayed by the operating system; storage medium for storing the selected piece of character information; extraction circuit for extracting a telephone number from the stored string of character information; output circuit for outputting the extracted telephone number in order to call-dial to a line.

According to still another aspect of the present invention, a recording medium which a program to be executed by a computer is stored, is provided. Wherein, the program includes: a procedure for displaying a first window which assists a telephone call dialing operation; a procedure for selecting a string of character information in a second window, which is different from the first window, and storing the selected string of character information; a procedure for extracting a telephone number from the stored character information; and a procedure of outputting the extracted telephone number in order to call-dial to a line.

BRIEF DESCRIPTION OF DRAWINGS

Other features and advantages of the invention will be made more apparent by the detailed description that follows, taken in conjunction with the accompanying drawings, wherein:

FIG. 7 is an illustration showing a displayed image while the telephone number analysis application unit in FIG. 2 is functioning;

DETAILED DESCRIPTION OF THE PREFERRED EMBODIMENTS

Next, an embodiment of the present invention will be described hereafter in detail with reference to the drawings.

Figure 1:
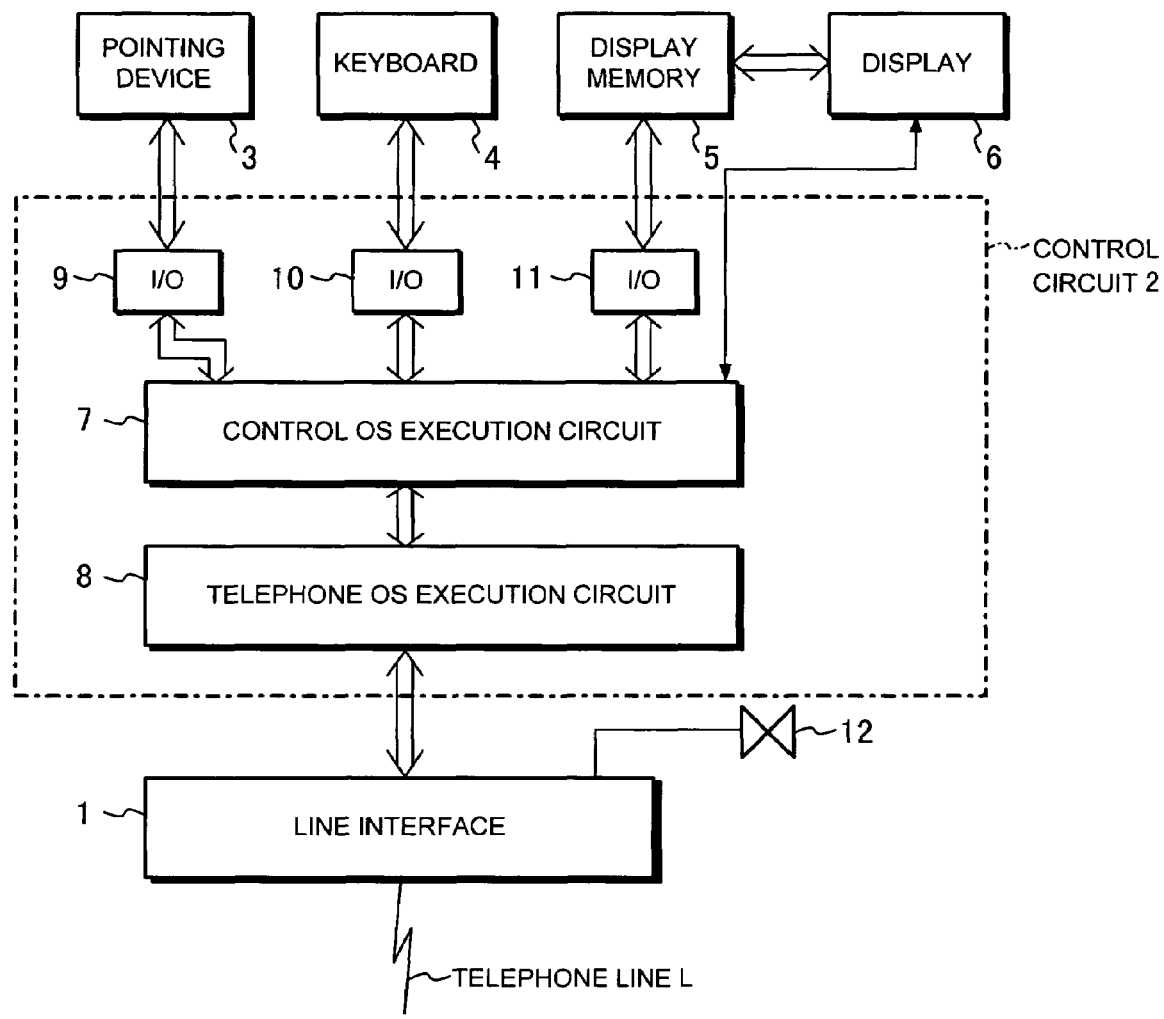
FIG. 1 shows the configuration of an information terminal according to an embodiment of the present invention.

FIG. 1 shows the configuration of an information terminal according to the embodiment of the present invention. The information terminal is such an information terminal as a personal computer which has an operating system (hereafter, referred to as "OS") as the basic software which can display windows.

The information terminal has: a line interface 1, which is connected to a telephone line L; a control circuit 2, which controls the entire system; a pointing device 3 connected to the control unit 2; a keyboard 4; a display memory 5; a display 6; and a telephone set 12 connected to the line interface 1.

The control circuit 2 has: a control OS execution circuit 7, which executes a control OS including both a basic OS and a word processor OS executed under the control of the basic OS; a telephone OS execution circuit 8, which executes a telephone OS featured in the invention; and input/output interfaces (I/Os) 9, 10, and 11 connected to the pointing device 3, the keyboard 4, and the display memory 5, respectively.

The telephone OS of the telephone OS execution circuit 8 is configured whereby call dialing can be performed with the help of the control operation of the control OS executed by the control OS execution circuit 7. Specifically, the telephone OS execution circuit 8 controls a display application in the control OS execution circuit 7 so that a telephone call controlling window (a first window) 100 as shown in FIG. 7 is displayed on the display 6 through the display memory 5. In addition, character information for telephone call dialing is taken out from a document window (a second window) with the assistance of the pointing device 3 or the keyboard 4, and analysis of a numeral in the character information taken is then made. Call dialing based upon the numeral obtained by the analysis is then made.

The first feature of the operation of the information terminal shown in FIG. 1 is that: as shown in FIG. 7, character information 111 is taken out from the document window for a word processor 110 (the second window) displayed on the display 6 by designating a region by inverting it or by enclosing it with a frame; only a number is taken out from the character information and displayed in the telephone call controlling window (the first window) 100; and call dialing based upon the displayed number is made to the telephone line L, which is operated under the control of the telephone OS execution circuit 8.

According to the information terminal as shown in FIG. 1, a desired telephone number information displayed in the document window for the word processor or in other windows under the control of the control OS, is taken out by a simple operation, and call designating is automatically made. Therefore, it is not necessary to input a telephone number by clicking the ten-key numeric pad or shortened dialing buttons displayed in the telephone key window or telephone panel window, and call dialing can be easily made at a high speed.

The telephone call controlling window 100 in FIG. 7 may be displayed as a tool bar. The telephone call controlling window 100 may be displayed a pop-up menu which is displayed on the top of a stack of windows in the display 6. This improves the operation of the telephone call controlling window 100.

Figure 8:
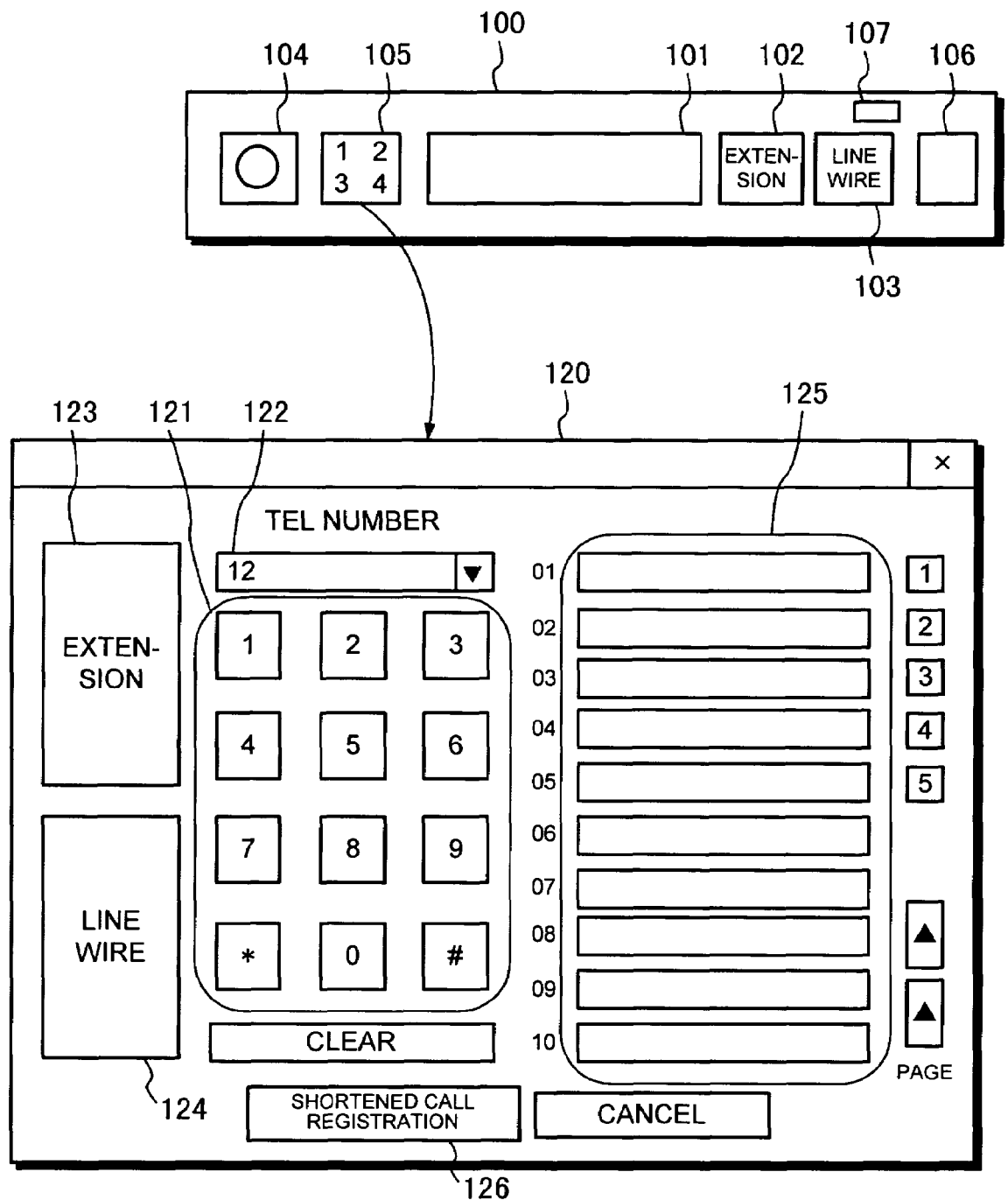
FIG. 8 is an illustration showing a displayed image while the ten-key numeric pad call dialing application unit in FIG. 2 is functioning.
Figure 9:
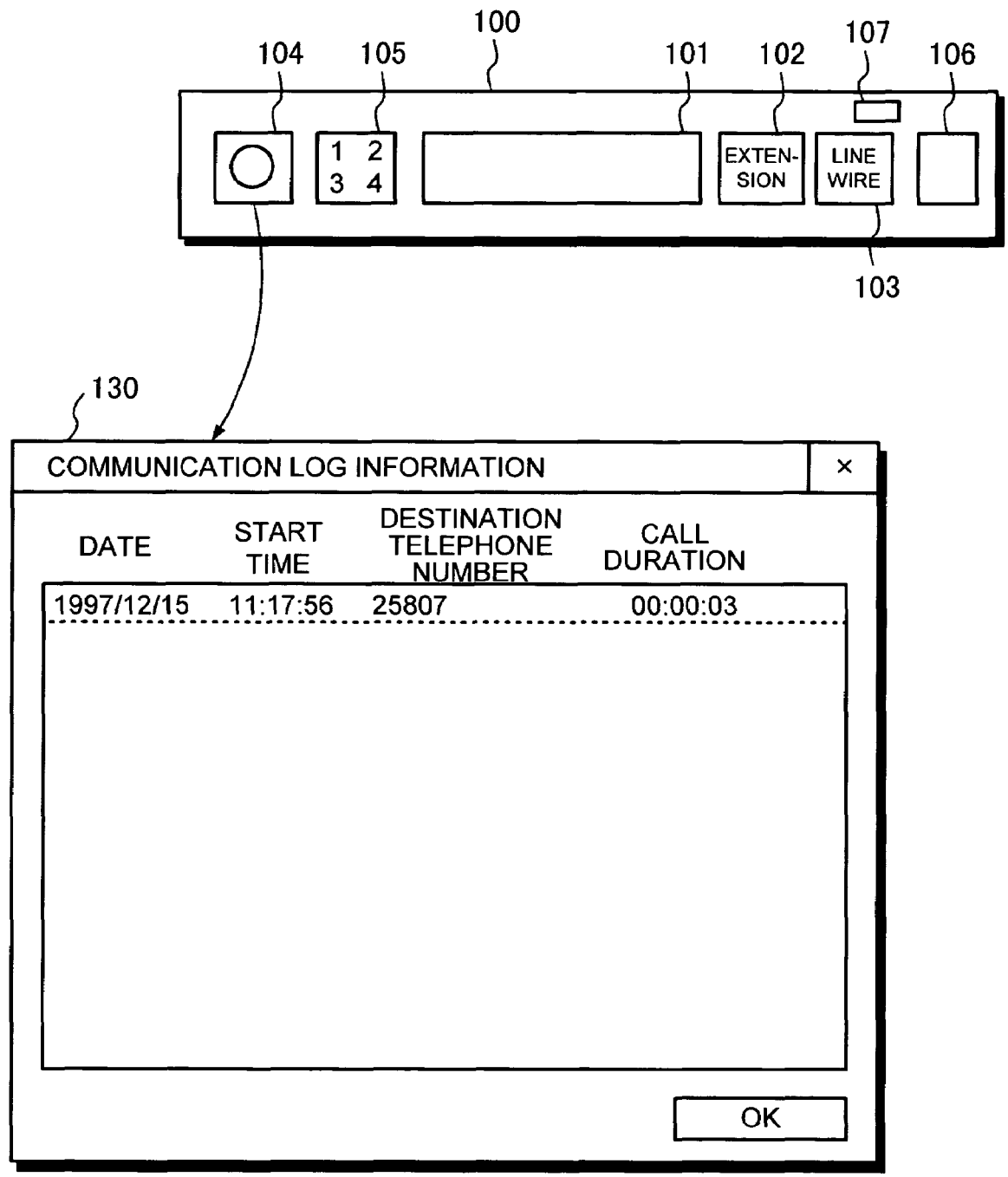
FIG. 9 is an illustration showing a displayed image while the log-based call dialing application unit in FIG. 2 is functioning.

The second feature of the operation of the information terminal is that, as shown in FIG. 8, the call dialing operation is added of: inputting from a ten-key numeric pad displayed in a telephone window 120; and clicking a logged record of a telephone number from a log record window 130 displayed as shown in FIG. 9 by the pointing device 3.

Figure 2:
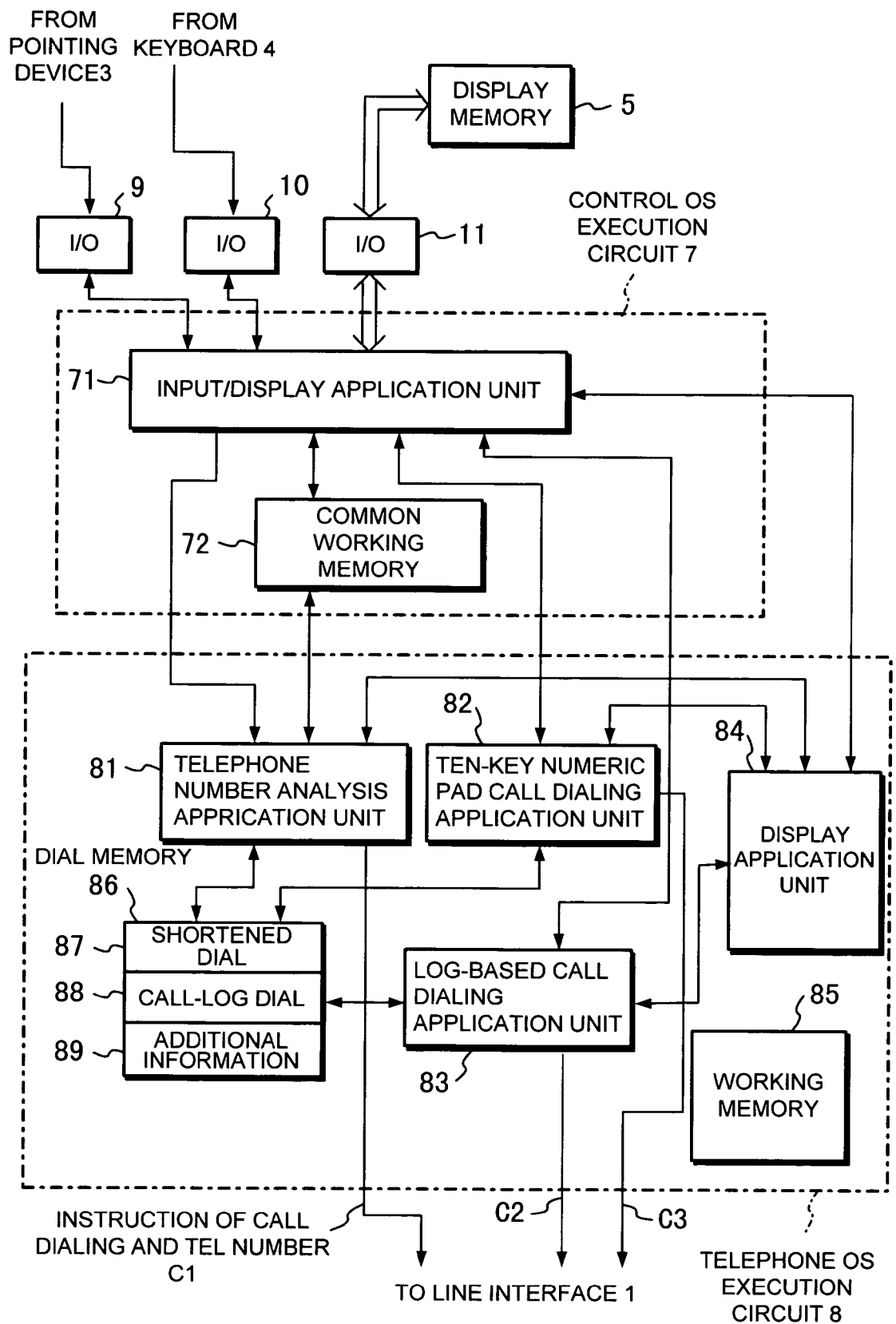
FIG. 2 shows the detailed configuration of a control circuit and its peripheral units of the information terminal shown in FIG. 1.

Next, the detailed configuration of the control OS execution circuit 7 and the telephone OS execution circuit 8 in the control circuit 2 of the information terminal in FIG. 1, and related peripheral equipment will be explained with reference to FIG. 2. In FIG. 2, the control OS execution circuit 7 is comprised of an input/display application unit 71 and a common working memory 72. The input/display application unit 71 executes both an input/display application program for inputting from the pointing device 3 and keyboard 4 and a display application program for displaying data stored in the display memory 5. The common working memory 72 stores information such as commands, characters, and numerals designated in the window, which are used by the control circuit 2.

The control OS of the control OS execution circuit 7 includes multiple application programs other than the input/display application program. However, only necessary units for call dialing and display are shown in the figure, for the sake of convenience.

The telephone OS execution circuit 8 has four application units, namely, a telephone number analysis application unit 81, ten-key numeric pad call dialing application unit 82, a log-based call dialing application unit 83, and a display application unit 84, which communicates a command and information through the input/display application unit 71 and the common working memory 72. The telephone OS execution circuit 8 also has a working memory 85 and a dial memory 86.

The telephone number analysis application unit 81 takes out character information from information stored in the common working memory 72, and executes an application program for analysis of a telephone number from the character information and call dialing operation with the telephone number. As shown in FIG. 7, information read out from the common working memory 72 is the character information 111 entered by designating a region in the word processor window 110 (or in the other window) with the assistance of the word processor OS. The telephone number, taken out from the character information and analyzed, is then sent to the line interface 1 and stored as dial record information in a dial log region 88 of the dial memory 86.

The ten-key numeric pad call dialing application unit 82 executes a call dialing operation dependent upon an entered telephone number, which is triggered by designation of the telephone window 120 (in FIG. 8) displayed on the display 6 through the pointing device 3. The designation entered by the pointing device 3 or the keyboard 4 is transmitted from the input/display application unit 71. In accordance with the designation, a code corresponding to the telephone number designated in the telephone window 120 via the pointing device 3 or keyboard 4, is either generated, or read out from the dial log 86. For example, in a shortened dial mode, a dial number corresponding to a designated, shortened dial is read out from the shortened dial region 87 of the dial memory 86; additional information such as a line wire connection dedicated dial number stored in additional information region 89 is attached to it as necessary; and then the call dial operation is executed.

The log-based call dialing application unit 83 executes the call dialing operation based upon the telephone number entered by designating a region in the call log window 130 in FIG. 9 by the pointing device 3 or the keyboard 4. The input/display application unit 71 transmits the designation entered through the pointing device 3 or the keyboard 4 is transmitted. The log-based call dialing unit 83 then reads out the telephone number, designated in the call log window 130 via the pointing device 3 or the keyboard 4, from the dial log region 88 of the dial memory 86, executing a call dialing operation, in conformity of the designation.

A telephone number, call dialing designation information c1, c2 and c3 generated by the respective telephone number analysis application unit 81, ten-key numeric call dialing application unit 82, and log-based call dialing application unit 83 are output to the line interface 1 shown in FIG. 1, and call dialing is performed.

The display application unit 84 is a circuit for executing the display operation for the telephone call controlling window 100, the telephone key window 120, the call log window 130, and a tool bar corresponding to the telephone call controlling window 100.

The dial memory 86 is a memory unit such as a hard disk, an IC memory, and a CD memory, in which the information stored is maintained even in the case of a power failure. The working memory 85 is a memory circuit such as a RAM used during the operation of each application unit.

Next, the call dialing operation of the telephone number analysis application unit 81 will be explained in detail with reference to a flowchart of FIG. 3. To make the explanation easier to understand, the explanation is made with reference to the detailed circuit of the telephone number analysis application unit 81 in FIGS. 2 and 4.

During the operation of the word processor OS with the assistance of the word processor window 110 in the display as shown in FIG. 7, character information 111 is regionally designated and selected (Step S1). We assume that the character information 111 selected is "TEL 03-542-1111". The control OS causes the input/display application unit 71 to transmit the character information 111 designated on the display memory 5, to the common working memory 72 (Step S2).

Figure 4:
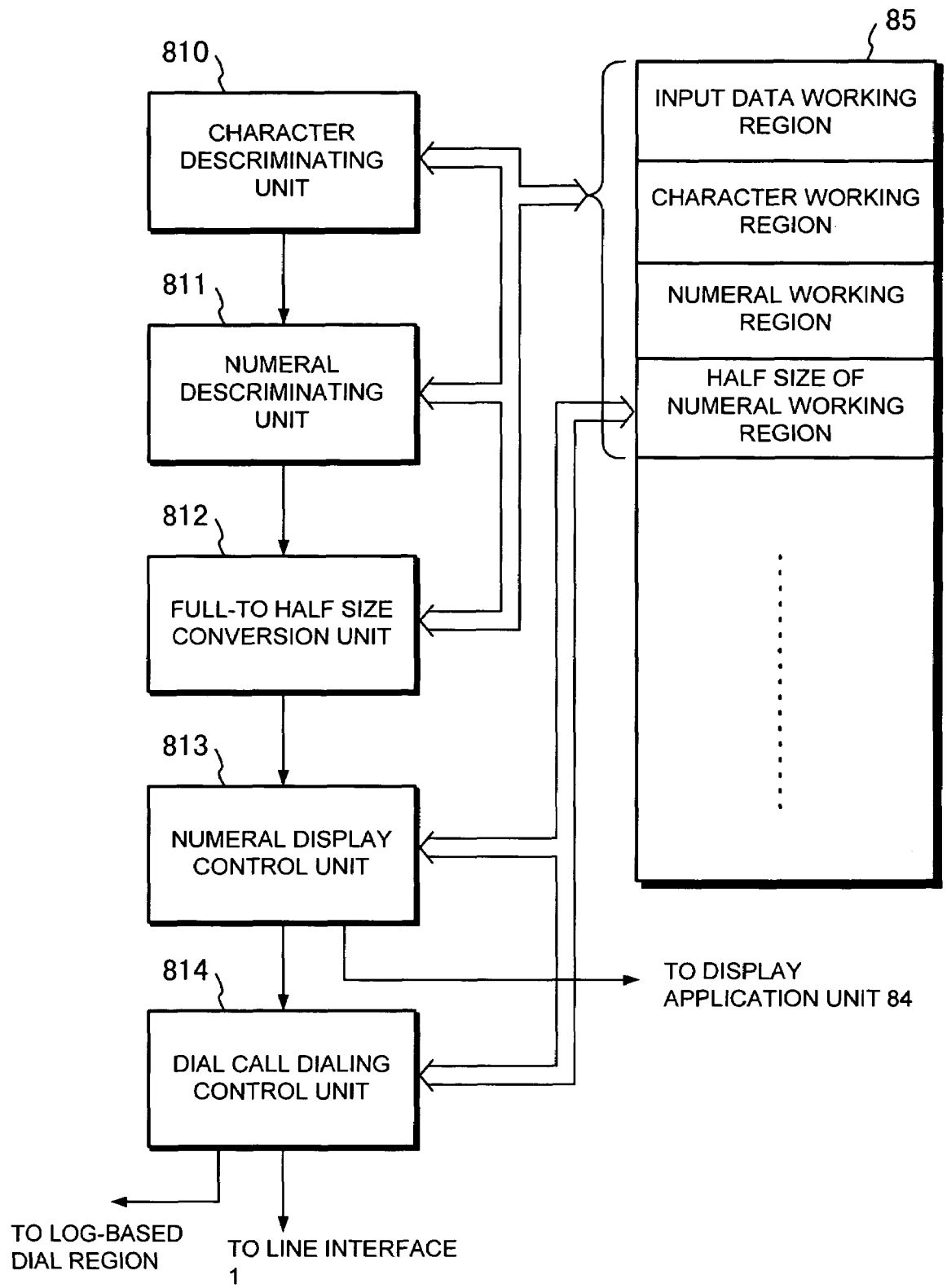
FIG. 4 shows the detailed configuration of the telephone number analysis application unit in FIG. 2.

Next, clicking the right button of the pointing device 3 (Step S3) starts the operation of the telephone number analysis application unit 81 of the telephone OS execution circuit 8, so that character information stored in the common working memory 71 is read out (Step S4), and stored in an input data working region of the working memory 85, as shown in FIG. 4.

Next, the character discriminating unit 810 (see FIG. 4) of the telephone number analysis application unit 81 determines whether or not a character array exists in the character information 111 (Step S5). If so, the character information is transmitted to a character working region of the character working memory 85 (Step S6). Otherwise, (i.e., if a region other than the character array has been regionally designated), the operation is terminated.

Next, a numeral discriminating unit 811 determines whether or not a full size numeral character or a half size numeral character exists in the character information stored in the character working region (Step S7). If the full size numeral character or the half size numeral character exists, no more than the numeral characters "035421111" are extracted from the character information, transmitting them to the numeral working region of the working memory 85 (Step S8). Otherwise, the operation is terminated.

Next, a full-to-half-size character conversion unit 812 determines whether the numeral information stored in the numeral working region is of a full size numeral (Step S9). If it is, the full size numeral is converted to a half size of it (Step S10), and the resulting half size numeral is transmitted to a half size numeral working region (Step S11). The conversion operation is a must to display the half size numerals in the display region 101 (FIG. 7) of the telephone call controlling window 100.

Next, a numeric display control unit 813 transmits the half size numerals stored in the half size numeral working region, to the display application unit 84. The display application unit 84 controls the input/display application unit 71 to store display data so that half size numerals are displayed in the display numeral region 101 of the telephone call dialing window 100.

As described above, character information 111 is taken out from the word processor window 110 shown in FIG. 7. No more than numerals are then detected as a telephone number and transmitted to both the half size numeral working region of the working memory 85 and the display application unit 84. Consequently, they are displayed in the telephone call dialing window 100. These operations are processed in steps S1 to S12.

If the telephone number in the display region 101 is of extension, an extension button 102 is clicked with the assistance of the pointing device 3. Otherwise, if it is of line wire (outer or public telephone line), a line wire button 103 is clicked. Accordingly, the dial call dialing control unit 814 in FIG. 4 reads out the telephone number "035421111" from the half size numeral working region in the working memory 85, and controls the line interface 1 to dial out the number read out to the telephone line L (Step S13). The line interface 1 connects the telephone set 12 to the telephone line L1 so that a current loop is established. It then dials the telephone number "035421111", enabling a call.

Thereafter, the call dialing control unit 814 transfers the call-dialed telephone number to the dial log region 88 (FIG. 2).

The telephone number for call dialing is extracted from the document window (the word processor window 110 in FIG. 7) to practice the call. On the contrary, it is possible by taking out character information from another window displayed by the control OS, and detecting a telephone number. In other words, all information displayed via the display memory 5 by the input/display application unit 71, is detected as a telephone number in conformity with the procedure shown in FIG. 3 so that call dialing can be performed.

Therefore, it is not necessary to enter a telephone number with a telephone key window displayed in the display 6, and call dialing can be performed quickly.

Figure 3:
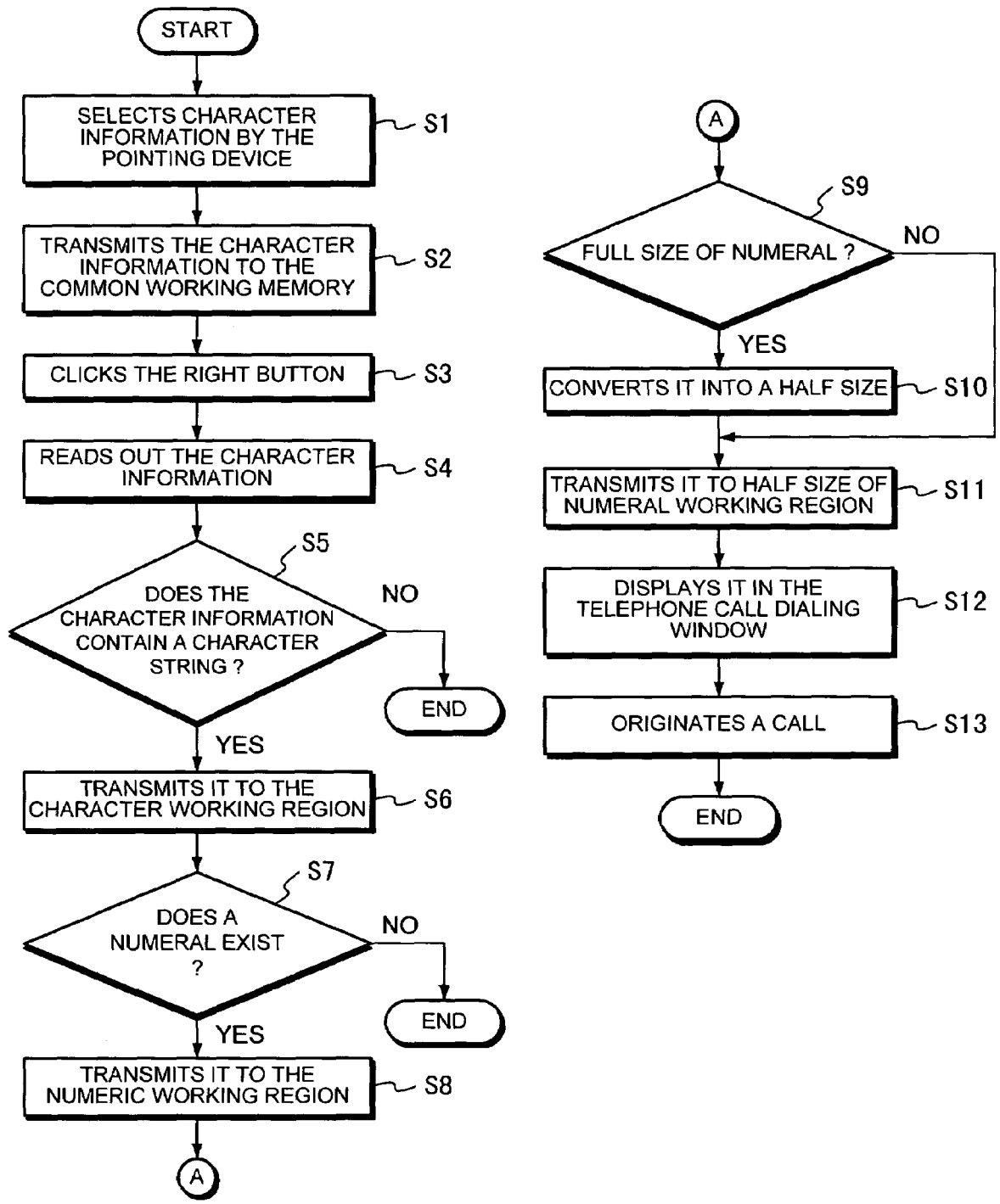
FIG. 3 is a flowchart showing the procedure in a telephone number analysis application unit in FIG. 2.

Furthermore, in step S13 of FIG. 3, the dial call dialing control unit 814 (see FIG. 4) can add a line wire connection dial number when line wire call dialing is processed.

Furthermore, in step S12 of FIG. 3, the display application unit 84 can display a character array along with a telephone number in the telephone call controlling window 100.

The line wire connection dial number and character array are stored in the additional information region 89 of the dial memory 86 in FIG. 2, and then read out from it. More precisely, they along with the telephone number are read out when a call is dialed. The telephone number is then attached to them, and they with the attachment are dialed.

Thereby, when the telephone line L is not a direct circuit to the public or outer telephone station (that is, the telephone line is an extension line), it is possible to automatically add a line wire connection dial number to the telephone number extracted by the telephone number analysis application unit 81. Moreover, attachment of a character array allows for transmission of character information.

Furthermore, in FIG. 7, it is not always necessary to display the telephone number extracted from the character information 111, in the telephone call controlling window 100 of the first window.

Furthermore, the numeral extracted from the character information 111 by the numeral discriminating unit 811 shown in FIG. 4, is not limited to the full size character. On the contrary, it can be of the double height size, double width size, or double height and width size.

Figure 5:
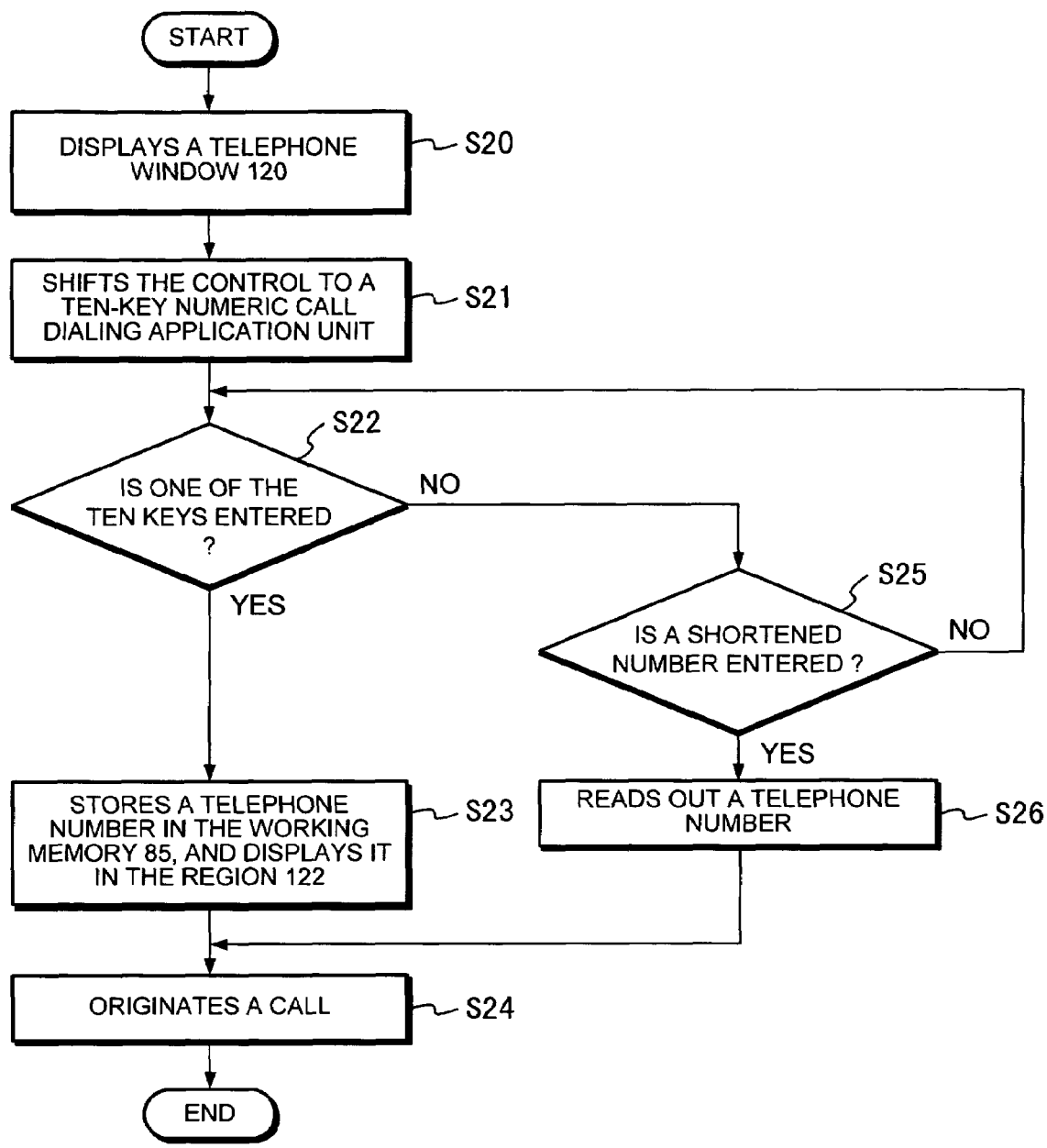
FIG. 5 is a flowchart showing the procedure in a ten-key numeric pad call dialing application unit in FIG. 2.

Next, the call dialing operation of the ten-key numeric call dialing application unit 82 will be explained with reference to FIGS. 5 and 8.

As shown in FIG. 8, when the ten-key tool button 105 is clicked in the telephone call controlling window 100 displayed on the screen, a telephone window 120 is displayed (Step S20). The telephone window 120 is generated and displayed in the same manner that the telephone call controlling window 100 is shown, with the display application unit 84 in FIG. 2, which controls the input/display application unit 71 to display the telephone window 120.

With the telephone window 120 displayed, the call dialing operation is performed with the ten-key numeric pad call dialing application unit 82 (Step S21). Wherein, when a numeric button of the ten keys 121 of the telephone window 120 is clicked (Step S22), the input/display application unit 71 informs the ten-key numeric pad call dialing application unit 82 of information about the click operation. Accordingly, the ten-key numeric pad call dialing application unit 82 then receives and stores the telephone number entered by the ten keys, in the working memory 85. At the same time, it controls the display application unit 84 to display the telephone number in the display region 122 (see FIG. 8) (Step S23).

Lastly, clicking the extension call dialing button 123 or the line wire call dialing button 124 displayed in the telephone window 120 by the pointing device 3, the ten-key numeric pad call dialing application unit 82 starts to call-dial the telephone number stored in the working memory 85, to the line interface 1 (Step S24).

Otherwise, if one of shortened number keys 125, which are also prepared and displayed in the telephone window 120, is clicked by the pointing device 3 (Step S25), the ten-key numeric pad call dialing application unit 82 reads out a telephone number stored in the shortened dial region 87 of the dial memory 86, corresponding to the clicked, shortened number key (Step S26). It then controls the line interface 1 to call-dial the telephone number.

It is noted that the operation of storing the shortened dial number in the dial memory 86 is allowed to start by clicking a shortened call record 126 in the telephone window 120. Specifically, by clicking one of the shortened number keys 125 after clicking the shortened call record 126 and entering a telephone number via the ten keys, the ten-key numeric pad call dialing application unit 82 stores the telephone number corresponding to the shortened number, in the shortened dial region 87.

As described above, with the telephone window 120 displayed from the telephone call controlling window 100, it is possible to call-dial on the ten-key basis, and to call-dial on the shortened number basis.

The ten-key numeric pad call dialing application unit 82 stores the telephone number call-dialed, in the dial log region 88 of the dial memory 86.

Figure 6:
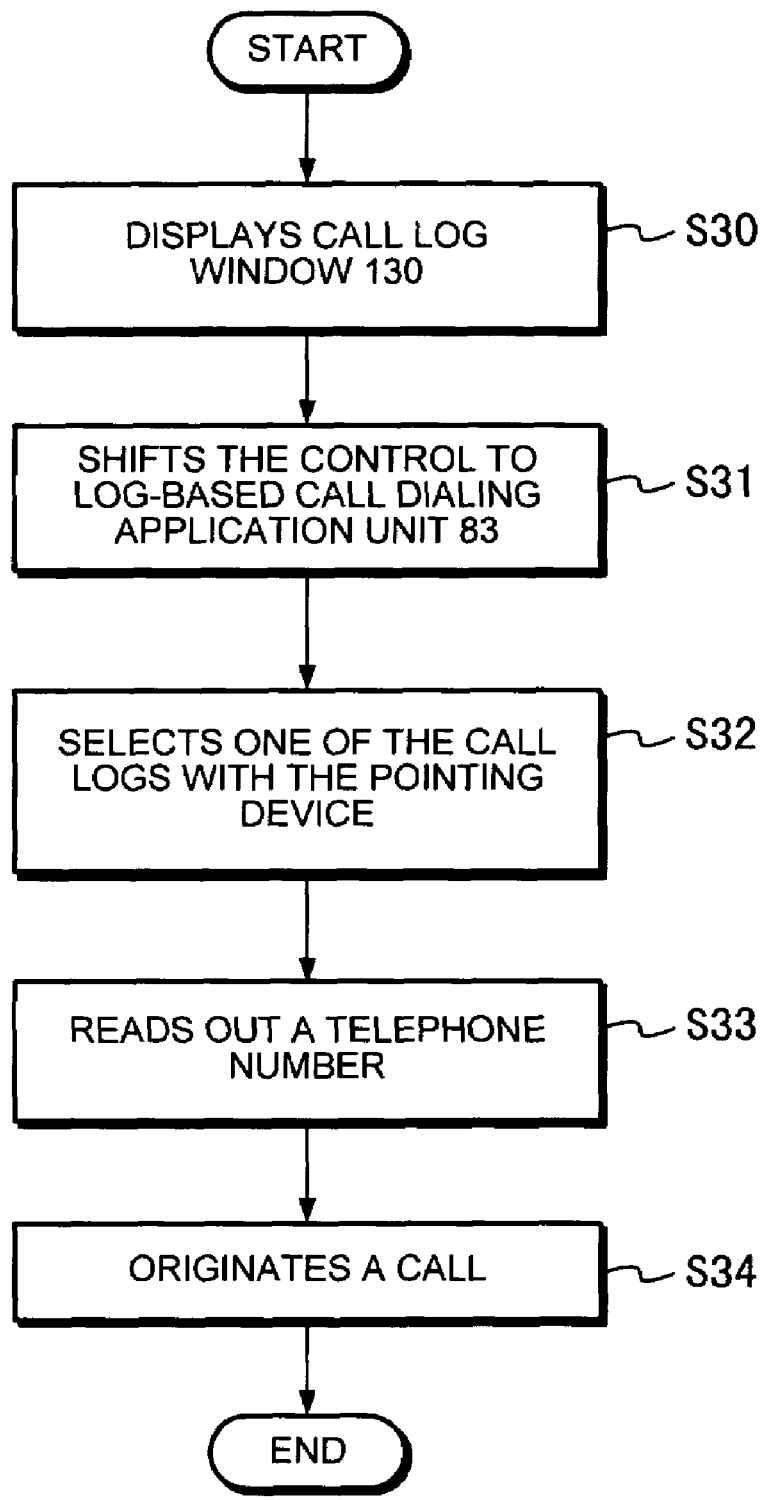
FIG. 6 is a flowchart showing the procedure in a log-based call dialing application unit in FIG. 2.

Next, the call dialing operation of the log-based call dialing application unit 83 will be explained with reference to FIGS. 6 and 9.

As shown in FIG. 9, when a call log tool button 104 in the telephone call controlling window 100 displayed on the screen is clicked by the pointing device 3 in FIG. 2, the call log window 130 is displayed (Step S30). The call log window 130 is generated by the display application unit 84 in FIG. 2, in the same manner that the telephone call controlling window 100 is done, and displayed via the input/display application unit 71.

When the call log window 130 is displayed, the call dialing operation is processed by the log-based call dialing unit 83 (Step S31). Wherein, one of the call logs displayed in the call log window is selected via the pointing device 3 (Step S32). The log-based call dialing application unit 83 reads out the destination telephone number from the selected call log from the dial log region 88 of the dial memory 86 (Step S33). The log-based call dialing application unit 83 then controls the line interface 1 to call-dial the telephone number (Step S34).

As described above, it is possible to call-dial again to the destinations call-dialed to date, with the call log window 130 displayed from the telephone call dialing window 100.

It is noted that the number of call logs to be stored is not limited.

According to the embodiment of the present invention, it is possible to display the tool bars of the telephone call dialing window 100, the telephone window 120, and the call log window 130 as shown in FIGS. 7 to 9 or the pop-up menu for them. The operation of displaying the tool bars or the pop-up menu can be performed by the display application unit 84, which outputs a command for displaying the tool bar or the pop-up menu to the input/display application unit 71. This causes an improvement of the operation relevant to the telephone call dialing window 100, and makes it easier to distinguish a telephone number.

As described above, regionally designating character information of choice displayed in the word processor window or other windows, and then clicking the right button of the pointing device, starting the operation of the telephone number analysis application unit 81 in FIG. 2 to call-dial a numeral as a telephone number included in the character information. It is noted that, however, the left button of the pointing device or a specific button of the keyboard 4 may also be utilized instead of the right button of the pointing device, alternately.

Furthermore, some control OS executed by the control OS execution circuit 7 may already have prepared the operation of regionally designating and clicking the right button of the pointing device for other commands of the control OS. In this case, a specific operation of the pointing device 3 can be performed so that the call dialing operation does not start when a regional designation is made. For example, the display application unit 84 prepares an operation undo button 106 in the telephone call dialing window 100 in FIG. 7, and when the operation undo button is clicked via the pointing device, the telephone number analysis application unit 81 stops selecting a telephone number from the character information and invalidates the call dialing operation.

Alternately, it is also allowed that when the telephone call dialing window 100 is shifted to the tool bar on the display by clicking a tool bar button 107 with the assistance of the pointing device 3, the telephone number analysis application unit 81 stops extraction of a telephone number from character information and invalidates the call dialing operation.

The input/display application unit 71 controls the telephone call controlling window 100 to an inactive state responsive to an inactive signal from the pointing device 3 or the keyboard 4. The telephone number analysis application unit 81 does not extract the telephone number from the character information responsive to the inactive signal FIG. 10 shows the configuration of the control circuit 2 in the information terminal according to the second embodiment of the present invention.

Figure 10:
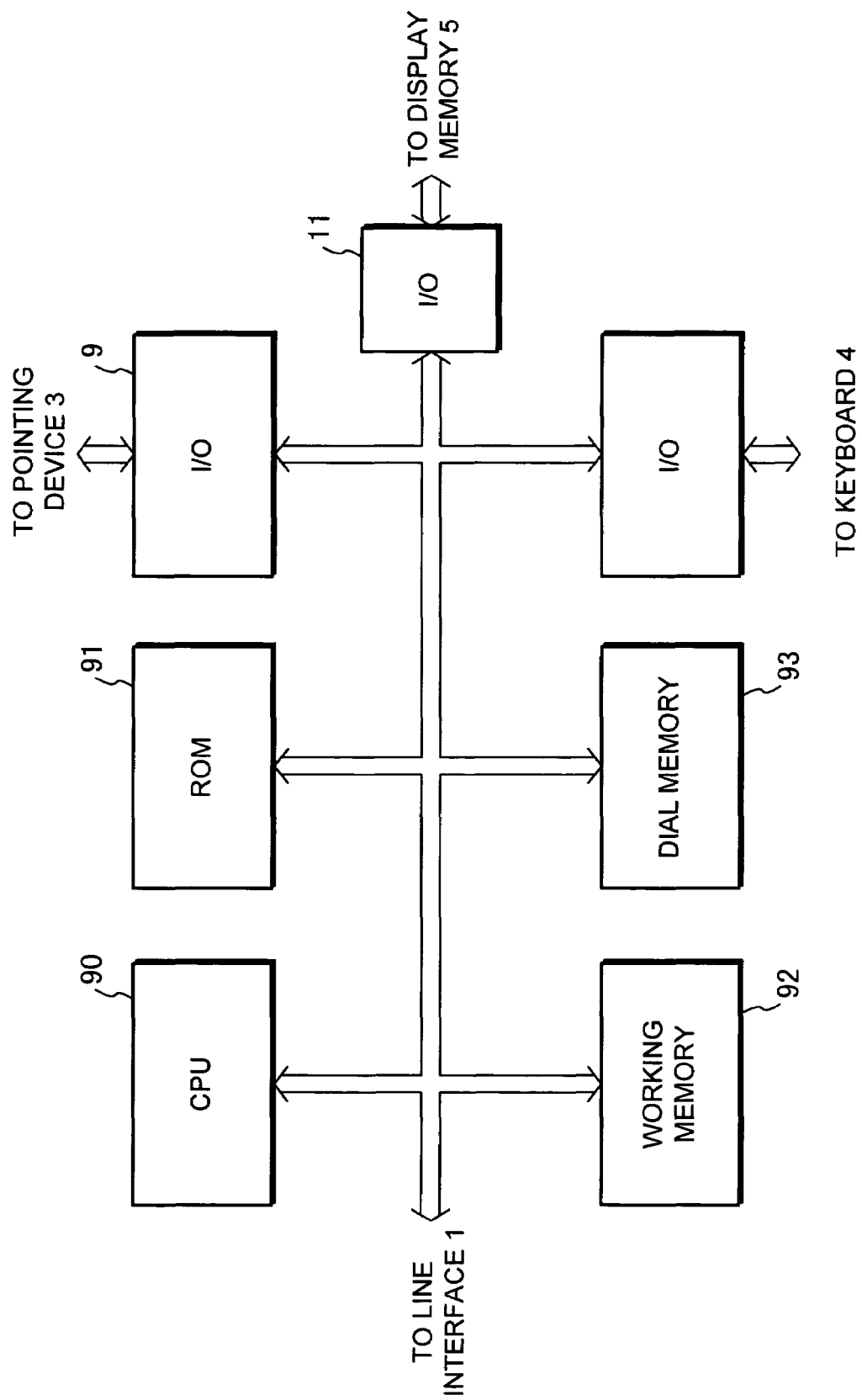
FIG. 10 shows the configuration of the control circuit of an information terminal according to a second embodiment of the present invention.

In FIG. 10, a CPU 90 controls the entire information terminal in conformity of the procedure of a program stored in ROM 91. A working memory 92 stores commands and data utilized during the execution of the program. A dial memory 93 includes the three same regions as those in the dial memory 86 in FIG. 2. I/Os 9, 10, and 11 are the same as those in FIG. 1.

The program stored in ROM 91 is a control OS and a telephone OS, which are both read out by the CPU 90. The operation of the control OS corresponds to that executed by the control OS execution circuit 7 in FIG. 2, whereas the operation of the telephone OS corresponds to that executed by each of the application units 81, 82, 83, and 84 in the telephone OS execution circuit 8. The telephone OS program is incorporated into the execution program of the control OS.

While the control OS is executed by the CPU 90, the character information 111 is extracted from the word processor window (the second window) 110 displayed on the screen 6 as shown in FIG. 7 via the display memory 5, by designating its region with display inversion of the region or with a frame enclosing it. The resulting character information extracted is then stored in the common working memory of the CPU 90. Thereafter, when the CPU 3 detects that the right button of the pointing device 3 is clicked, the CPU 90 takes out no more than numeric information such as a telephone number from the character information in the same manner that the telephone number analysis application unit 81 of the telephone OS execution circuit 8 in FIG. 2 does, outputting it to the display memory 5. Accordingly, the telephone number extracted is displayed in the display region 101 of the telephone call dialing window (the first window) 100 in FIG. 7. The CPU 90 also controls the line interface 1 to call-dial the telephone number displayed, to the telephone line L.

Other than the above operations, the CPU 90 executes the program stored in the ROM 91 so that the telephone window 120 is displayed, as shown in FIG. 8. It also call-dials upon receipt of an entered one of the ten keys displayed in the telephone window. Moreover, it executes the operation of displaying the call log window 130, and call dialing when one of the call logs is clicked by the pointing device 3.

It is noted that the embodiment of the present invention is not limited to the configurations described above. For example, the line interface 1 in FIG. 1 can be a modem for going on-line with the telephone set 12.

The line interface 1 can also be a dial tone sender connected to the telephone set 12. The telephone set 12 is connected to the telephone line L. When the telephone set 12 acquires the line, the dial tone is then transmitted to the telephone line L via the telephone set 12. It should be understood that the configuration of the line interface according to the present invention is not limited to be the ones described above.

Furthermore, the information terminal also is not limited to a computer. On the contrary, it can be an apparatus with an OS which can display a window, such as a facsimile, a portable telephone set, and other related communication terminals.

As described above, a system according to the present invention is configured, where: a desired piece of information is extracted from a word processor document or other windows displayed with the execution of a control OS, by a simple operation; numeric information such as a telephone number is detected in it; and call dialing is automatically performed. With this configuration, a user can save a lot of time and labor for the operation of displaying a telephone window and entering a telephone number in the window, and call-dialing easily and quickly.

Note that many apparently widely different characteristics of the present invention can be used without departing from the spirit and scope thereof; it is to be understood that the invention is not limited to the specific features thereof; except as defined in the appended claims.

What is claimed is:

1. A telephone call dialing method, for use in an information terminal with an operating system which can display a plurality of windows, comprising:
    performing a first operation to:
        select a string of character information in a window displayed by the operating system, and
        store the selected string of character information; and
    performing a second operation to:
        analyze the selected string of character information at an application level to determine if non-numeric characters are included in the selected string of character information;
        extract a telephone number from the stored string of character information; and
        automatically dial a call to a line based upon the extracted telephone number,
    wherein said first operation is a designation of a region of the displayed window containing the character information, and
    wherein said second operation is one of pressing at least one button of a pointing device and pressing at least one key of a keyboard.

2. The telephone call dialing method according to claim 1, wherein the selected string of character information is stored in a common working memory which is shared by the operating system.

3. The telephone call dialing method according to claim 1, wherein the selected string of character information is one selected by a regional designation, and then stored in a common working memory which is shared by the operating system.

4. The telephone call dialing method according to claim 1, wherein extracting a telephone number includes deleting information except for that relevant to numerals from the selected string of character information, and the telephone number is extracted from the resulting remainder.

5. The telephone call dialing method according to claim 1, wherein said window is associated with an application unrelated to call-dialing.

6. The telephone call dialing method according to claim 5, wherein said application is a word processor.

7. A telephone call dialing method, for use in an information terminal with an operating system which can display a plurality of windows, comprising:
- displaying a first window;
- performing a first operation to:
- select a string of character information in a second window displayed by the operating system, and
- store the selected string of character information;
- performing a second operation to:
- analyze the selected string of character information at an application level to determine if non-numeric characters are included in the selected string of character information;
- extract a telephone number from the stored string of character information, and
- display the extracted telephone number in the first window; and
- automatically dial a call to a line based upon the extracted telephone number,
- wherein said first operation is a designation of a region of the displayed second window containing the character information, and
- wherein said second operation is one of pressing at least one button of a pointing device and pressing at least one key of a keyboard.

8. The telephone call dialing method according to claim 7, wherein the first window is displayed overlapped on top of the plurality of windows displayed on the screen.

9. The telephone call dialing method according to claim 7, wherein the first window is displayed as a tool bar.

10. The telephone call dialing method according to claim 7, wherein the first window comprises a telephone region with call dialing keys used to designate a telephone call dialing destination, and the telephone call dialing method further comprises the steps of:
- selecting that one of the call dialing keys in the telephone region,
- detecting the selected telephone number, and
- call-dialing based upon the detected telephone number.

11. The telephone call dialing method according to claim 7, wherein the first window further comprises a call log region where the past telephone call dialing destinations are displayed, and the telephone call dialing method further comprises the steps of:
- selecting one of the past telephone call dialing destinations displayed in the call log region,
- detecting the selected telephone number, and
- call-dialing based upon the detected telephone number.

12. The telephone call dialing method according to claim 7, wherein said third operation includes pressing a button displayed in the first window.

13. The telephone call dialing method according to claim 12, wherein when the extracted telephone number displayed in the first window is an internal number, the pressed button is an extension button.

14. The telephone call dialing method according to claim 12, wherein when the extracted telephone number displayed in the first window is an external number, the pressed button is a line wire button.

15. The telephone call dialing method according to claim 7, wherein said first window is associated with a first application related to call-dialing.

16. The telephone call dialing method according to claim 7, wherein said second window is associated with a second application unrelated to call-dialing.

17. The telephone call dialing method according to claim 16, wherein said second application is a word processor.

18. An information terminal, with an operating system which can display a plurality of windows, comprising:
- storage means for storing a string of character information selected through a window displayed by the operating system, in response to a first operation performed by a user;
- analyzing means for analyzing the selected string of character information at an application level to determine if non-numeric characters are included in the selected string of character information;
- extraction means for extracting a telephone number from the string of character information stored in the storage means, in response to a second operation performed by the user; and
- output means for outputting the extracted telephone number and automatically dialing a call to a line, in response to the second operation performed by the user,
- wherein said first operation is a designation of a region of the displayed window containing the character information, and
- wherein said second operation is one of pressing at least one button of a pointing device and pressing at least one key of a keyboard.

19. The information terminal according to claim 18, further comprising call dialing control means for controlling the operation of call dialing to the line, based upon the telephone number output from the output means, in response to the second operation performed by the user.

20. The information terminal according to claim 18, wherein the extraction means deletes information except for the one relevant to numerals from the selected string of character information, and extracts a telephone number from the resulting remainder.

21. A computer-readable recording medium storing a program to be executed by a computer, wherein the program includes:
- a procedure for selecting a string of character information in a window displayed by the operating system, and storing the selected string of character information, in response to a first operation performed by a user;
- a procedure for analyzing the selected string of character information at an application level to determine if non-numeric characters are included in the selected string of character information; and
- a procedure for extracting a telephone number from the stored string of character information and automatically dialing a call to a line based on the extracted telephone number, in response to a second operation performed by the user.

22. A computer-readable recording medium storing a program to be executed by a computer, wherein the program includes:
- a procedure for displaying a first window which assists a telephone call dialing operation;
- a procedure for selecting a string of character information in a second window, which is different from the first window, and storing the selected string of character information, in response to a first operation performed by a user;
- a procedure for analyzing the selected string of character information at an application level to determine if non-numeric characters are included in the selected string of character information; and
- a procedure for extracting a telephone number from the stored character information and automatically dialing a call to a line based on the extracted telephone number, in response to a second operation performed by the user, wherein said first operation is a designation of a region of the displayed second window containing the character information, and wherein said second operation is one of pressing at least one button of a pointing device and pressing at least one key of a keyboard.

23. The computer-readable recording medium according to claim 22, wherein said second window is associated with an application unrelated to the call dialing operation.

24. The computer-readable recording medium according to claim 23, wherein said application is a word processor.

* * * * *